Sept. 1, 1970   R. A. KAPLAN   3,526,852
SPATIALLY COHERENT ARRAY OF OPTICAL ENERGY SOURCES
Filed March 1, 1968   2 Sheets-Sheet 1

United States Patent Office 3,526,852
Patented Sept. 1, 1970

3,526,852
SPATIALLY COHERENT ARRAY OF OPTICAL
ENERGY SOURCES
Robert Allen Kaplan, Huntington Station, N.Y., assignor
to Hazeltine Research, Inc., a corporation of Illinois
Filed Mar. 1, 1968, Ser. No. 709,549
Int. Cl. H01s 3/02
U.S. Cl. 331—94.5                                    10 Claims

ABSTRACT OF THE DISCLOSURE

An optical diplexer for combining the optical energy from two optical sources having different frequency characteristics into a single, spatially coherent, beam. A beam splitting apparatus divides the energy from one source into two substantially equal components which are in quadrature phase. Each component is separately coupled to a different interferometer. The energy from the other source is similarly divided by a second beam splitting apparatus and coupled to the opposite port of the respective interferometer. The interferometers combine the respective components into two beams which are in quadrature phase. These two beams are coupled back to the first beam splitting apparatus where they are combined into a single spatially coherent beam and coaxially propagated in space. Alternative arrangements are also covered.

---

The present invention relates to an improved laser system for combining the energy for a plurality of independent laser sources to provide a beam whose energy density at a large distance from the source is subsantially greater than the sum of the energy densities of the individual sources at the same large distance. This invention has particular usefulness in applications that require an intense narrow beam of optical energy.

As used in this specification "optical energy" refers to energy in that portion of the electromagnetic wave spectrum whose frequency is greater than $10^{11}$ Hz. A laser is a device which generates or amplifies optical energy by means of stimulated emission of radiation.

It is often desirable to provide a beam having a greater energy density than that which can be provided by a single laser resonator or amplifier. One prior art approach to this problem employs a number of independent laser oscillators placed side-by-side, each illuminating a separate collimating lens having a fixed diameter and associated beamwidth. In a system of this type, because of the spatial separation of the sources and lenses, the energy density (energy per unit area) of the combination at the source is the same as that of an individual source. If the sources are focused to some common distant point, the energy density at the distant point is equal to the sum of the energy densities of the individual sources at that same point. The overall beamwidth is equal to that of one of the individual sources even though the total aperture area has been increased by the number of sources, N. On the other hand, if this total aperture area were utilized by spatially coherent energy, the resultant overall solid-angle beamwidth would be decreased by a factor of N and the resultant power density at a distant point would be increased by a factor of N. Thus, if N independent lasers were combined in a spatially coherent way and the resultant beam were radiated from an area N times the area of the individual lasers, the power density at a distant point would be $N^2$ times as great as that produced by a single laser at the same point.

The object of the present invention is therefore to provide an optical system capable of combining the outputs of several independent laser oscillators in a spatially coherent manner making it possible to radiate the resultant beam through a common lens or aperture so as to produce a beam of light having a narrow beamwidth and high power density.

As will be demonstrated, the first step to providing a spatially coherent beam from an array of independent oscillators is to provide an apparatus that is capable of combining the energy from two independent, spatially coherent, optical sources such that the resultant beam is spatially coherent. It is therefore a further object of the present invention to provide an optical diplexer, for combining the energy from a first and second optical energy source such that the energies are superimposed in space and propagate in exactly the same direction. This results in an increase by a factor of two in the energy density of the beam at the source, over that obtained with a single source.

In accordance with the present invention there is provided an optical diplexer for superimposing in space the energy from first and second optical energy sources, the energy from the sources being distinguishable on the basis of a common property, which comprises first and second selective means, for distinguishing between the optical energy from the first and second sources on the basis of the common property, for superimposing in space the portions of the energy from the first and second sources coupled thereto; third means for directing a portion of the energy from the first source toward one input of each of the selective means; and fourth means for directing a portion of the energy from the second source toward a second input of each of the selective means and for superimposing in space the optical energies acted upon by the first and second selective means with no substantial energy being coupled back to either of the sources; the diplexer being so constructed and arranged that the energy from the first and second sources are superimposed and coaxially propagated in the same direction in space with the resultant energy density being greater than the energy density of the first or second optical energy sources.

Referring to the drawings.

Figure 1C:
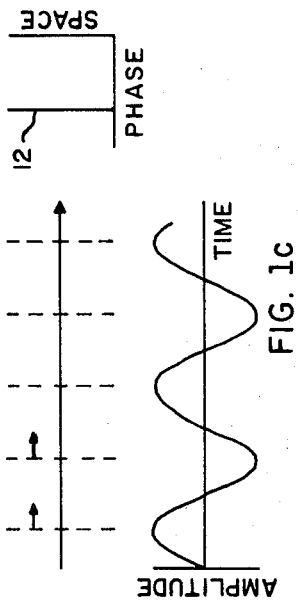
FIGS. 1a, 1b and 1c illustrate a single laser oscillator and its radiation pattern.
Figure 1B:
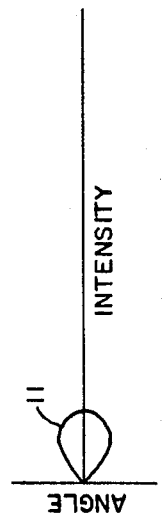
Figure 1A:
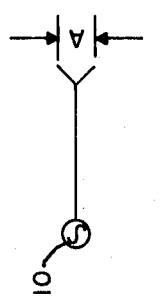

FIG. 1a represents a single laser oscillator 10 having an aperture A and a radiation pattern 11, as illustrated in FIG. 1b. The source 10 produces a plane wave, illustrated in FIG. 1c, whose spatial coherence is indicated by the well-defined phase front 12 which is constant in time. It will be appreciated that FIG. 1c represents an ideal laser having complete spatial coherence. The degree of spatial coherence will depend on the particular type of laser employed, gas lasers having a high degree of spatial coherence and solid-state lasers having a lesser degree of coherence.

Figure 2B:
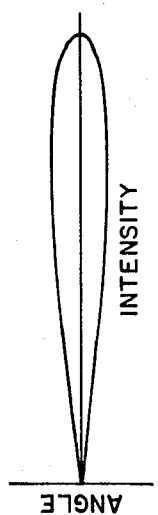
FIGS. 2a and 2b illustrate four laser oscillators whose combined output is spatially and temporally coherent and the resultant radiation pattern.
Figure 2A:
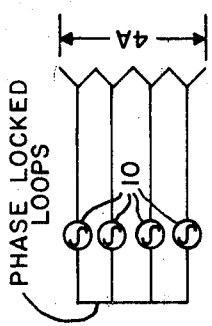

If it were possible to combine a plurality of independent oscillators 10 as shown diagrammatically in FIG. 2a to produce a completely coherent wave, both spatially and temporally, the resultant wave would have a similar amplitude and phase relationship as illustrated in FIG. 1c, and the energy density of the resultant beam would be greatly increased. For example, FIG. 2b illustrates the directive radiation pattern which would result from radiating the combination of four phase-locked sources 10 from an aperture of area 4A as shown in FIG. 2a, in a manner to produce a truly coherent beam. The energy density of the resultant beam at a distant point as illustrated in FIG. 2b would be $N^2$ times the energy density of an individual beam (where N equals the number of resonators 10) or 16 times as great as that of an individual beam for $N=4$. However, difficulty has been encountered in attempting to phase lock independent laser oscillators and obtain a resultant wave which is both spatially and temporally coherent. Furthermore, it will be demonstrated below that both spatial and temporal coherence is not necessary to achieve the desired result illustrated in FIG. 1d.

Figure 3C:
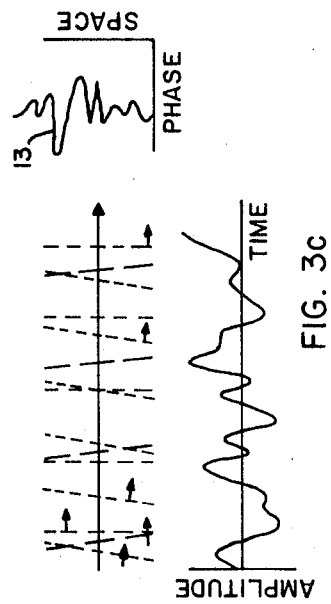
FIGS. 3a, 3b and 3c illustrate four side-by-side laser oscillators and the resultant radiation pattern.
Figure 3B:
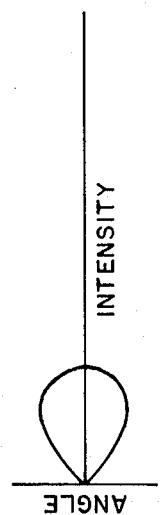
Figure 3A:
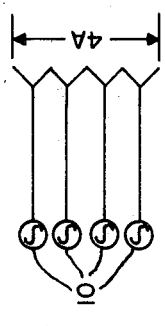

FIG. 3 schematically represents another prior art approach to combining the output of several independent oscillator to achieve a greater output. FIG. 3a illustrates four independent oscillators 10 placed side-by-side with a total aperture (4A) four times that of a single oscillator. The resultant waveform, showin in FIG. 3c, of the superposition of these four plane waves does not have a constant phase front and does not have a well-defined spatial phase variation in time 13 and is therefore said to be spatially and temporally incoherent. The radiation pattern shown in FIG. 3b for an array of this type provides a beamwidth that is equal to that of the individual oscillator and a beam intensity at a distant point which is only four times that of an individual oscillator 10.

Figure 4C:
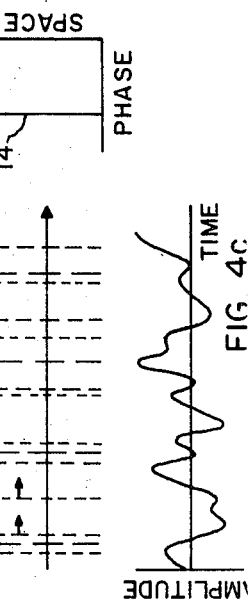
FIGS. 4a, 4b and 4c illustrate four laser oscillators whose outputs are combined to form a single spatially coherent beam in accordance with the present invention and the resultant radiation pattern.
Figure 4B:
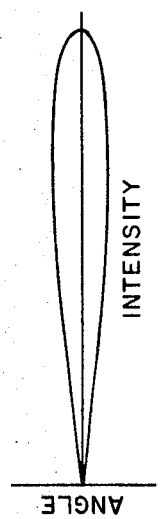
Figure 4A:
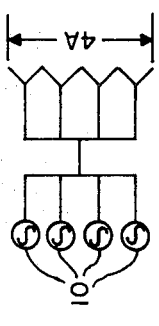

FIG. 4 illustrates an array of independent oscillators which have been combined in a manner to produce a spatially coherent array. The resulting radiation pattern is essentially identical to that of the fully coherent array illustrated in FIG. 2b. Oscillators 10 in FIG. 4a are combined, in a manner to be explained in detail below, to produce a spatially coherent wave as illustrated by the well-defined phase front 14 in FIG. 4c, although they are not temporally coherent. The resultant radiation pattern from this arrangement, as shown in FIG. 4b, is essentially identical to that of FIG. 2b, namely that it has a peak power density which is $N^2$ times that of an individual source and a solid-angle beamwidth which is $1/N$ times that of the individual source. Therefore, to achieve the high intensity narrow beam it is not essential that the energy from the plurality of sources be phase locked so as to produce a completely coherent wave. It is sufficient if the resultant wave is spatially coherent, i.e., travel in the same direction in the same region in space.

The first step to providing an array of spatially coherent laser oscillators is to provide a device that combines the energy from two laser oscillators to produce a resultant spatially coherent wave. A spatially coherent beam is formed from independent laser oscillators when the radiation from these oscillators is completely superimposed, that is to say, made to travel in the same direction in the same region in space. However, it can be shown that it is impossible to provide a network which can superimpose, without loss, two indistinguishable independent sources unless they are phase locked and as mentioned above, phase locking is difficult to achieve and particularly difficult to maintain. To provide the required lossless superposition, some degree of distinguishability must exist between the two laser signals. One convenient method to provide distinguishability is to provide frequency diversity between the two laser oscillators.

Figures 5, 6:
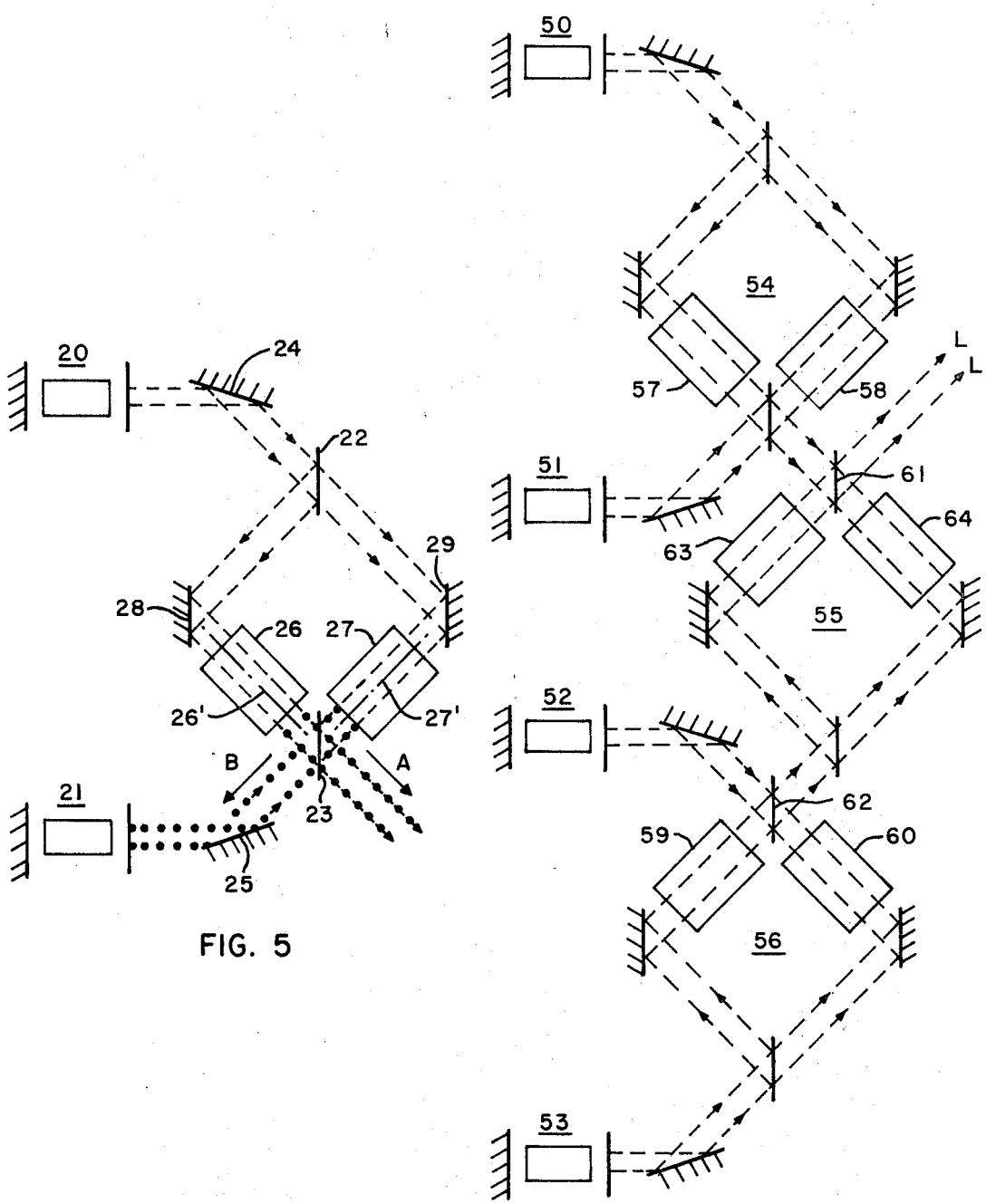
FIG. 5 illustrates an optical diplexer constructed in accordance with the present invention.
FIG. 6 illustrates a spatially coherent array of four laser oscillators constructed in accordance with the present invention.

FIG. 5 illustrates an optical diplexer constructed in accordance with the present invention, which superimposes in space the energy from the first and second Fabray-Perot oscillators 20 and 21, the energy from said oscillators having different frequencies. Frequency diversity among Fabry-Perot oscillators can be obtained by designing the oscillator to have different sets of axial mode resonant frequencies. Since the frequency of the resonant modes is determined, at least in part, by the laser reflector spacing, different sets of axial mode frequencies can be obtained by having different spacings. Alternatively, the frequency diversity could be achieved by a difference in the emission frequency of the active laser material. Such differencies can be obtained, for example, by impurity doping and pressure and temperature control in the case of injection diode lasers. In any case, the laser oscillators 20 and 21 have different non-overlapping frequencies. The distinguishability of the resonators is indicated by representing the energy radiated from resonator 20 by a series of dashes while the energy radiated from resonator 21 is represented by a series of dots.

The optical diplexer of FIG. 5 includes first and second half-silvered mirrors 22 and 23. It is characteristic of half-silvered mirrors to reflect one-half the energy incident thereon, the angle of reflection being equal to the angle of incidence, and to transmit the other half of the incident energy without deviation. It is also characteristic of the half-silvered mirror that the reflected and transmitted components of the incident energy are in quadrature phase.

The optical diplexer of FIG. 5 also includes a first fully reflective mirror 24 spatially oriented to direct the energy from the Fabry-Perot oscillator 20 to be incident on the half-silvered mirror 22 at a predetermined angle. The half-silvered mirror 22 thereby divides the energy from oscillator 20 into two substantially equal parts which are in quadrature phase relationship.

The diplexer also includes a second fully reflective mirror 25 spatially oriented to direct the energy from the oscillator 21 to be incident on the half-silvered mirror 23 at the same angle as the energy from the oscillator 21 is incident on the half-silvered mirror 22. The half-silvered mirror 23 thereby divides the energy from oscillator 21 into two substantially equal parts which are in quadrature phase. The diplexer further includes a pair of Fabry-Perot interferometers or filters 26 and 27 located between said first and second half-silvered mirrors 22 and 23 and spatially oriented so that their respective longitudinal axes 26' and 27' lie in separate planes which intersect opposite sides of the half-silvered mirror 23 at the predetermined angle. The properties of the filters 26 and 27 are identical and have frequency passbands such that the energy from oscillator 20 is transmitted while the energy from oscillator 21 is reflected. Each of said filters thereby superimposes in space one-half the energy from said first source 20 with one-half the energy from said second source 21. The diplexer further includes third and fourth fully reflected mirrors 28 and 29 for providing that the component energies from the half-silvered mirror 22 are directed toward and coplanar with the longitudinal axes 26' and 27' of the respective Fabry-Perot filters 26 and 27.

OPERATION

In operation, the energy from oscillator 20 is directed to the half-silvered mirror 22 by the fully reflective mirror 24. Mirror 24 is positioned to cause the energy from oscillator 20 to be incident on the half-silvered mirror 22 at a predetermined angle. This angle is not critical, the sole requirement being that the energy is incident on half-silvered mirror 22 at an angle which utilizes the beam spliting characteristics of the mirror; that is to say the incident energy is divided into two equal parts which are in quadrature phase. In FIG. 4 the energy is shown to be incident on half-silvered mirror 22 at an angle of approximately 45° and for this illustration 45° is the predetermined angle.

The reflected and transmitted components of the energy of oscillator 20 from half-silvered mirror 22 are incident on the fully reflective mirrors 28 and 29, respectively. Mirrors 28 and 29 serve to cause the respective component energies to be incident on filters 26 and 27 respectively, coincident with their longitudinal axes 26' and 27'.

A second input is coupled to the opposite end of each of the filters 26 and 27 from the half-silvered mirror 23. The half-silvered mirror 23 and fully reflective mirror 25 serve a similar function to the half-silvered mirror 22 and mirror 24, namely mirror 25 directs the energy from oscillator 21 onto half-silvered mirror 23 at the predetermined angle (45° in FIG. 5) where it is divided into two equal parts which are in quadrature phase. The component of the energy from oscillator 21 reflected by half-silvered mirror 23 is coupled to the opposite end of filter 26 as is the energy from oscillator 20. And similarly the component of the energy from oscillator 21 transmitted by half-silvered mirror 23 is coupled to the opposite end of filter 27, as is the energy from oscillator 20. Each of these filters is designed to have exactly the same electrical length and reflectivity as resonator 20 and will therefore transmit energy that has the frequency characteristics of resonator 20 and reflect energy that has the frequency characteristics of resonator 21. Therefore each filter superimposes one-half the energy from oscillator 20 with one-half the energy from oscillator 21 and directs the superimposed energy toward the half-silvered mirror 23. The energy directed to half-silvered mirror 23 from filters 26 and 27 is superimposed in space and coaxially propagated in the direction of arrow A with the resultant energy density being equal to the sum of the energy density of the individual sources. If the relative positions of mirrors 22 and 23 and filters 26 and 27 are properly adjusted, (as in a conventional Michelson interferometer), none of the energy is reflected back to either of the oscillators 20 or 21. This is due to the fact that the components of the energy from filter 27 which tend to be transmitted by half-silvered mirror 23 are 180° out of phase with the energy components from filter 26 which tend to be reflected by half-silvered mirror 23. Therefore, no energy can be propagated in the direction of arrow B, causing all the energy to be propagated in the direction of arrow A.

Since the energy from sources 20 and 21 is superimposed in space it can be focused by a lens or other device as if emanating from a single source. For example, focusing the output of the FIG. 5 diplexer with the lens having an aperture equal to the sum of the apertures of the individual sources produces a far field radiation pattern whose energy density is $N^2$ as great as the energy density of a single source, 20 or 21.

As described, the important aspects of the mechanical alignments of the elements of the diplexer of FIG. 5 are that the energy from both sources be coincident with the longitudinal axis of the respective filters and the energy superimposed by the filters intersect each other at the half-silvered mirror 23, being incident thereon at the same angle. The differential phase response of the half-silvered mirrors 22 and 23 between the reflected and incident energy components will thereby cause all the energy to be directed entirely in the direction of arrow A with none reflected back along the direction of arrow B to oscillator 21. It is obvious that none of the energy is reflected back to the oscillator 20.

As described, the diplexer of FIG. 5 permits superposition of two waves in space in such a way that the power is doubled while the cross-sectional area and the divergence of the individual beams is maintained. This means that the power per unit area per unit solid angle (radiance) is doubled. Radiance is a fundamental property of an electromagnetic source which is a convenient measure of its performance in system applications. If two coherent sources were merely placed side-by-side similar to the four sources illustrated in FIG. 3a, the power would be doubled, but the radiance remains the same as that for a single wave. If the two coherent waves are superimposed according to the present invention, the resultant wave is spatially coherent and both the power and the radiance are doubled. This principal can be extended to combine a large number of independent sources. The radiance produced by the combination of N sources is N times that of a single wave.

FIG. 6 illustrates a spatially coherent array of optical energy sources constructed in accordance with the present invention. The array includes a plurality of independent Fabry-Perot laser resonators 50, 51, 52 and 53. The number (N) of resonators in a particular array is determined by the energy density requirement of the beam produced. For purposes of illustration the FIG. 6 array includes the four stated resonators but the teaching of the present invention is equally applicable to an array having more or fewer resonators.

The array also includes a plurality of diplexers 54, 55 and 56 arranged to combine the energies from all the resonators with a resultant energy density at a large distance from the source which is substantially greater than the sum of the energy density of the individual sources at the same distance. FIG. 6 illustrates that the number of diplexers required is one less than the number of resonators to be combined. This inherently follows from the fact that each diplexer has two distinct inputs.

The operation of the individual diplexers in the FIG. 6 array is similar to the operation of the diplexer in FIG. 5 in that each diplexer in FIG. 6 combines the energy from two sources, in a manner fully explained above. Diplexer 54 combines the output of resonators 50 and 51 and therefore has its Fabry-Perot filters 57 and 58 selected to transmit the axial mode frequencies of resonator 50 and reflect those of resonator 51. Similarly, diplexer 56 combines the outputs of resonators 52 and 53 and therefore has its Fabry-Perot filters 59 and 60 tuned to transmit the axial mode resonant frequencies of resonator 56 and reflect those of resonator 52. Diplexer 55 is spatially oriented so that the energies superimposed by diplexers 54 and 56 are incident on the half-silvered mirrors 61 and 62 of diplexer 55 at the same angle. The filters 63 and 64 of diplexer 55 are tuned to transmit the frequencies of resonators 52 and 53 while reflecting the signals from resonators 50 and 51. This is accomplished by having the electrical length of the filters 63 and 64 equal to the mean electric length of resonators 52 and 53 and by reducing their end plate reflectivity to provide a broader bandwidth. The resultant output from diplexer 55, illustrated by the arrows L, is the superposition of all four laser beams. Although the temporal coherence has been changed, this single beam, the output of diplexer 55, has the same degree of spatial coherence as the individual laser beams produced by resonators 50–53. The spatial coherence is unchanged since the individual beams are superimposed in space and propagating in the same direction. As previously described, the energy density in the far field of this resultant beam when collimated by an aperture four times the original source aperture, is substantially greater than the sum of the energy densities of the individual sources 50–53, and more particularly is approximately 16 times as great as the energy density from one of the sources 50–53.

While there has been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An optical diplexer for superimposing in space the energy from first and second optical energy sources, the energy from said sources being distinguishable on the basis of a common property, comprising:
   first and second selective means, for distinguishing between the optical energy from said first and second sources on the basis of said common property, for superimposing in space the portions of the energy from said first and second sources coupled thereto;
   third means for directing a portion of the energy from said first source toward one input of each of said selective means;

and fourth means for directing a portion of the energy from said second source toward a second input of each of said selective means and for superimposing in space the optical energies acted upon by said first and second selective means with no substantial energy being coupled back to either of said sources;

said diplexer being so constructed and arranged that the energy from the first and second sources are superimposed and coaxially propagated in the same direction in space with the resultant energy density being greater than the energy density of said first or second optical energy sources.

2. An optical diplexer as specified in claim 1 in which said first and second sources supply optical energy having different frequencies and said selective means are frequency selective means.

3. An optical diplexer as specified in claim 1 in which the third and fourth means for directing the energy into said selective means each includes beam splitting means for dividing the supplied energy into two substantially equal portions so that the energy directed into each input of each selective means is approximately half the energy supplied by one of said sources.

4. An optical diplexer as specified in claim 3 in which said first and second sources supply optical energy having different frequencies and said selective means are frequency selective means.

5. A spatially coherent array of optical energy sources comprising:

N sources for supplying optical energy, the energy from said sources being distinguishable on the basis of a common property;

$(N-1)$ optical diplexers as specified in claim 1 with the diplexers spatially oriented so that the input to one of more of said diplexers is the energy from two or more sources superimposed in space by one or more of said diplexers, for superimposing in space and coaxially propagating in the same direction the energy from all of said sources with the resultant energy density being equal to the sum of the energy densities of the individual sources.

6. An optical diplexer for superimposing in space the energy from first and second optical energy sources, the energy produced by said sources having first and second frequency characteristics, respectively, comprising:

first and second frequency selective filters for distinguishing between the optical energy from said first and second sources by transmitting energy of said first frequency and reflecting energy of said second frequency;

third means, including a first beam splitting apparatus, for dividing the energy supplied by said first source into two substantially equal portions and for directing different ones of said portions toward one input of each of said frequency selective filters;

and fourth means, including a second beam splitting apparatus, for dividing the energy supplied by said second source into two substantially equal portions and for directing different ones of said portions toward a second input of each of said frequency selective filters, for causing each of said filters to superimpose in space a portion of the energy from said first source with a portion of the energy from said second source, and for superimposing in space the optical energy acted upon by said first and second filters with no substantial energy being coupled back to either of said sources;

said diplexer being so constructed and arranged that the energy from the first and second sources is superimposed and coaxially propagated in the same direction in space with the resultant energy density being substantially equal to the sum of the energy densities of the individual sources.

7. An optical diplexer as specified in claim 6 in which the longitudinal axis of each of the optical filters is parallel to the direction of propagation of the respective portions of the energy from each of the sources coupled to each filter for causing the energy superimposed by each of said filters to be directed toward said second beam splitting means and incident thereon at the same angle.

8. An optical diplexer as specified in claim 6 in which the portion of the energy from said first source directed toward said second beam splitting means from said first optical filter is in quadrature phase with the portion of the energy from said first source reflected to said half-silvered mirror from said second optical filter and in which the portion of the energy from said second source reflected to said beam splitting means form said first optical filter is in quadrature phase with the portion of the energy from said second source reflected to said beam splitting means from said second optical filter for superimposing in space the energy from said first and second optical filters with no substantial amount of energy being coupled back to either of said sources.

9. A spatially coherent array of optical energy sources, comprising:

N independent Fabry-Perot laser resonators, each of said resonators having a different set of axial mode resonant frequencies;

and $(N-1)$ optical diplexers, as specified in claim 6, for superimposing in space the energy from said resonators;

the array being so constructed and arranged that the energies from the first and second reasonators are coupled to and superimposed by the first diplexer, the energy superimposed by the first diplexer is coupled to and comprises one input of a second diplexer wherein it is combined with the energy from another of said resonator or resonators, the energy superimposed by said second diplexer is coupled to and comprises one input of successive diplexers until the energy from all said resonators is combined by said $(N-1)$ diplexers with a resultant energy density being equal to the sum of the energy densities of the individual sources.

10. An optical diplexer for superimposing in space the optical energy from first and second Fabry-Perot laser resonators, the energy produced by each of said resonators having a different set of axial mode resonant frequencies and being spatially and temporally incoherent with each other comprising:

a first half-silvered mirror for dividing the energy from said first source into two substantially equal portions which are in quadrature phase;

a first fully reflective mirror positioned to direct the energy from said first source to be incident on said first half-silvered mirror at a predetermined angle;

a second half-silvered mirror, coplanar with and spaced from said first half-silvered mirror, for dividing the energy from said second source into two substantially equal portions which are in quadrature phase;

a second fully reflective mirror positioned to direct the energy from said second source to be incident on said second half-silvered mirror at said predetermined angle;

a pair of Fabry-Perot filters, located between said first and second half-silvered mirrors and spatially oriented so that their longitudinal axes lie in separate planes which intersect opposite sides of said second half-silvered mirror at said predetermined angle, for reflecting the energy from said second source and transmitting the energy from said first source, for providing that each of said filters superimposes in space one-half the energy from said first source with one-half the energy from said second source;

third and fourth fully reflective mirrors for providing that the component energies produced by said first half-silvered mirror are directed toward and coplanar with the longitudinal axis of the respective Fabry-Perot filter;

the diplexer being so constructed and arranged that one-half the energy from each source is coupled to the opposite ends of said Fabry-Perot filters, the component energies are superimposed in space by said Fabry-Perot filter, the superimposed energies are incident on said second half-silvered mirror at a predetermined angle with the component energies from said sources being in quadrature phase relationship so that the component energies acted upon by said Fabry-Perot filters are superimposed in space and coaxially propagated in the same direction by said second half-silvered mirror with the resultant energy density being equal to the sum of the energy densities of the individual sources.

References Cited

UNITED STATES PATENTS 3,312,905   4/1967   Lewis.
3,414,840   12/1968   Di Domenico et al.

RONALD L. WIBERT, Primary Examiner

W. L. SIKES, Assistant Examiner

U.S. Cl. X.R.

356—106